(12) United States Patent
Hajduczenia

(10) Patent No.: US 10,178,085 B2
(45) Date of Patent: Jan. 8, 2019

(54) ESTABLISHING A SECURE FILE TRANSFER SESSION FOR SECURE FILE TRANSFER TO A DEMARCATION DEVICE

(75) Inventor: Marek Hajduczenia, Riverview, FL (US)

(73) Assignee: ZTE Portugal-Projectos de Telecommunicações Unipessoal Lda, Lisbon (PT)

(*) Notice: Subject to any disclaimer, the term of this patent is extended or adjusted under 35 U.S.C. 154(b) by 101 days.

(21) Appl. No.: 14/129,884

(22) PCT Filed: Jun. 28, 2012
(Under 37 CFR 1.47)

(86) PCT No.: PCT/IB2012/001280
§ 371 (c)(1),
(2), (4) Date: Jun. 30, 2014

(87) PCT Pub. No.: WO2013/001347
PCT Pub. Date: Jan. 3, 2013

(65) Prior Publication Data
US 2014/0373116 A1 Dec. 18, 2014

Related U.S. Application Data

(60) Provisional application No. 61/502,281, filed on Jun. 28, 2011.

(51) Int. Cl.
*H04L 29/06* (2006.01)
*H04L 9/32* (2006.01)
(Continued)

(52) U.S. Cl.
CPC .......... *H04L 63/083* (2013.01); *G06F 21/606* (2013.01); *H04L 9/3226* (2013.01);
(Continued)

(58) Field of Classification Search
USPC ........... 726/6, 2, 21, 36; 713/150, 163, 181; 350/255, 264, 276
See application file for complete search history.

(56) References Cited

U.S. PATENT DOCUMENTS 6,766,454 B1 * 7/2004 Riggins .................... 713/185
2006/0015724 A1 * 1/2006 Naftali ................ H04L 63/0823
713/168

(Continued)

FOREIGN PATENT DOCUMENTS

WO 1999/005813 A2 2/1999
WO WO2008024133 * 2/2008

OTHER PUBLICATIONS

International Search Report and Written Opinion dated Nov. 6, 2012 for International Application No. PCT/IB2012/001280, filed Jun. 28, 2012 (8 pages).

(Continued)

*Primary Examiner* — Sharif E Ullah
(74) *Attorney, Agent, or Firm* — Perkins Coie LLP

(57) ABSTRACT

Systems, devices and techniques for establishing a secure file transfer session for secure downloading of configuration files to a Demarcation device are disclosed. Communication is established with a first network device. A password challenge message is received from the first network device. A username is generated. A password is generated using the password challenge message and a locally stored salt key. The username and the password are communicated to a second network device via the first network device, to facilitate establishing a secure file transfer connection with the second network device.

15 Claims, 5 Drawing Sheets

(51) Int. Cl.
*G06F 21/60* (2013.01)
*H04L 29/08* (2006.01)

(52) U.S. Cl.
CPC ........ *H04L 9/3271* (2013.01); *H04L 63/0838* (2013.01); *H04L 67/06* (2013.01); *G06F 2221/2103* (2013.01); *G06F 2221/2117* (2013.01); *Y02D 30/30* (2018.01)

(56) References Cited

U.S. PATENT DOCUMENTS

| | | | |
|---|---|---|---|
| 2006/0095750 A1* | 5/2006 | Nye | G06F 9/3848 712/240 |
| 2009/0199289 A1* | 8/2009 | Davis | H04L 63/168 726/12 |
| 2010/0058060 A1* | 3/2010 | Schneider | H04L 9/0844 713/171 |
| 2012/0019379 A1* | 1/2012 | Ben Ayed | G08B 13/1436 340/539.1 |
| 2012/0093508 A1* | 4/2012 | Baykal | H04L 12/2881 398/58 |
| 2013/0332726 A1* | 12/2013 | Galehouse | H04L 63/0823 713/156 |
| 2014/0010085 A1* | 1/2014 | Kavunder | H04W 28/0215 370/235 |

OTHER PUBLICATIONS

Office Action dated Mar. 24, 2015 for Canadian Application No. 2,840,154, filed Jun. 28, 2012 (3 pages).

* cited by examiner

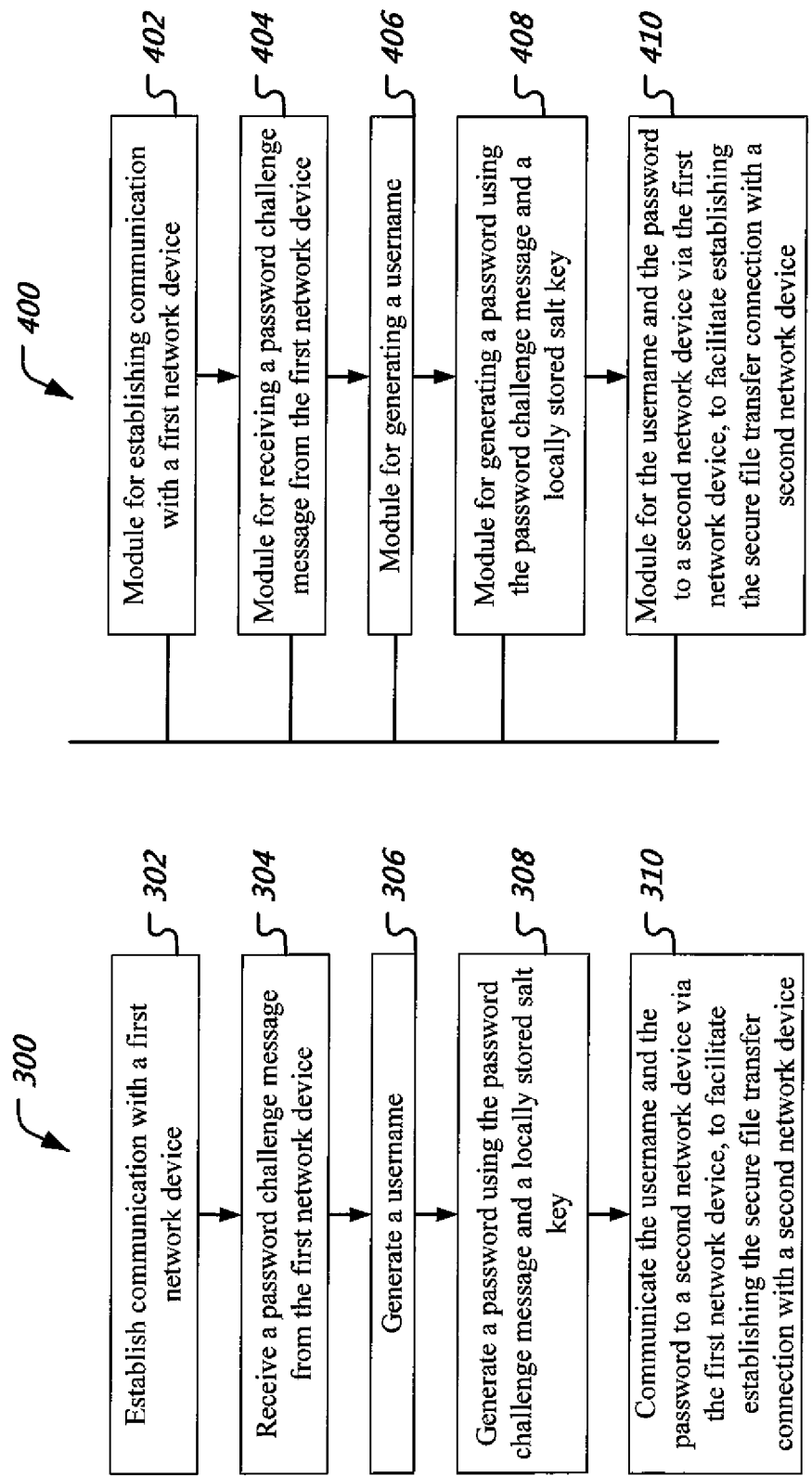

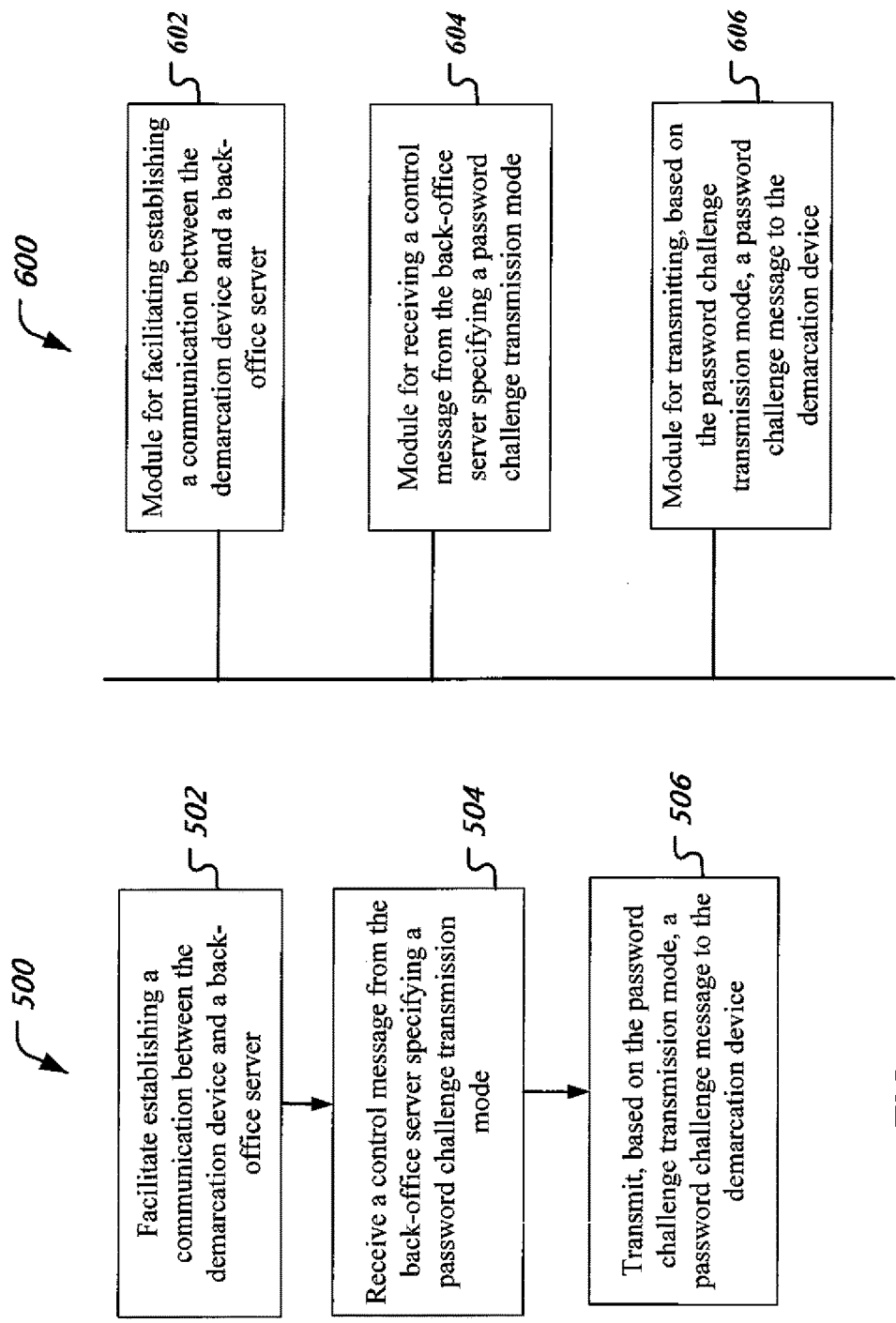

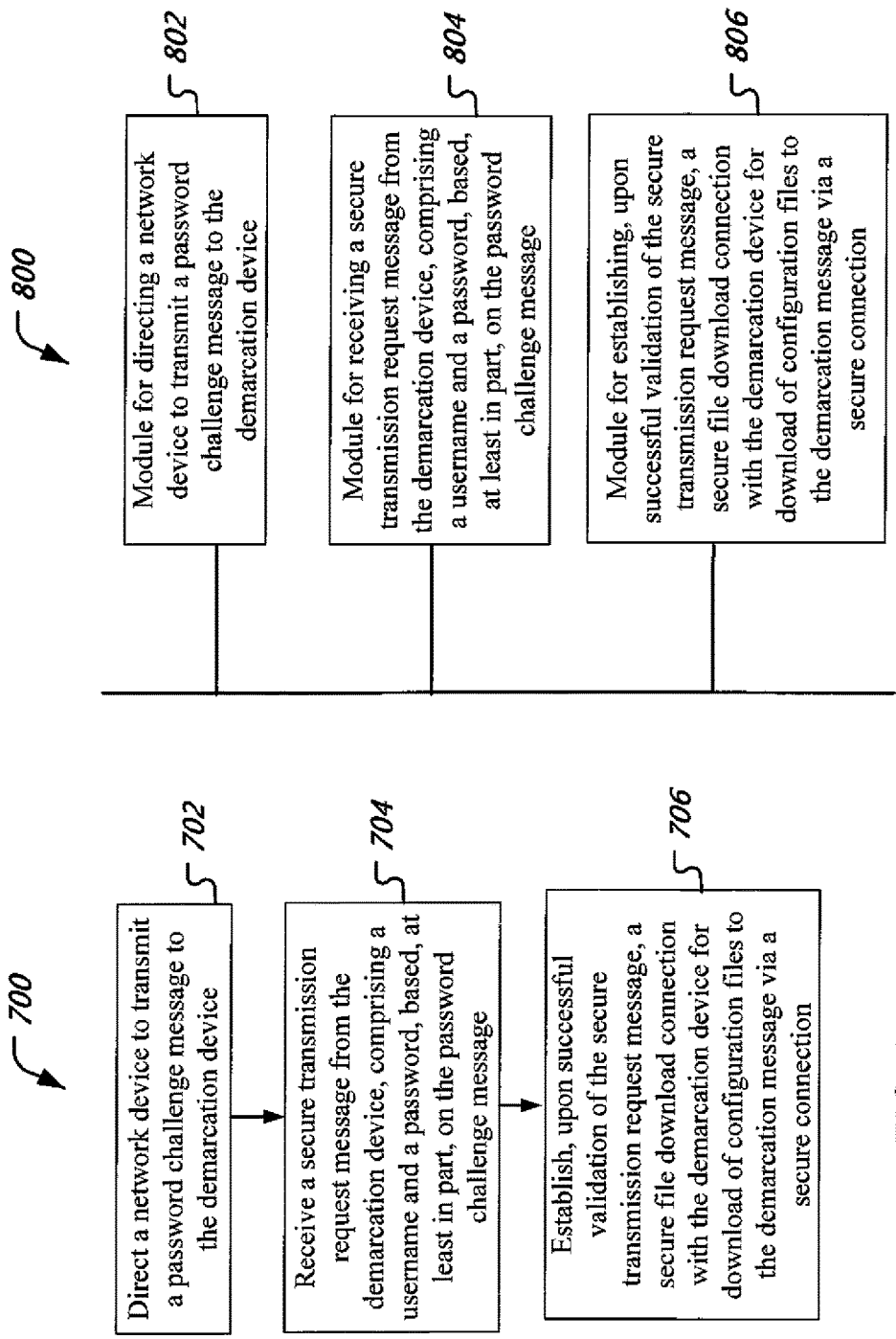

ESTABLISHING A SECURE FILE TRANSFER SESSION FOR SECURE FILE TRANSFER TO A DEMARCATION DEVICE

TECHNICAL FIELD

This patent document relates to systems, devices and techniques for data communications in DOCSIS Provisioning of Ethernet Passive Optical Network (DPoE).

BACKGROUND

Data Over Cable Service Interface Specification (DOCSIS) is a telecommunications standard that permits the addition of high-speed data transfer to an existing Cable TV (CATV) system. DOCSIS is employed by cable television operators to provide data services such as Internet over the hybrid fiber coaxial (HFC) infrastructure. Ethernet Passive Optical Network (EPON) is an optical network architecture based on point to multipoint (P2MP) topology in which a single optical fiber and multiple passive optical splitters are used to provide services from a central office or headend to multiple customer premises. EPON uses a point to point (P2P) Emulation Sublayer to render the P2MP network to appear as a collection of P2P links to the higher protocol layers. A network Operations, Administration and Maintenance (OAM) mechanism is included in EPON to facilitate operations and management of EPON.

DPoE (DOCSIS Provisioning over EPON) uses EPON and a DOCSIS Mediation Layer (DML) solution to provide the translation between the EPON and the DOCSIS back-office systems for provisioning of DOCSIS services. Details of this architecture, as well as expected roles and functionalities of specific network elements, e.g., a Demarcation device, a DPoE Bridge Optical Network Unit (B-ONU), the DPoE System, can be found in the DPoE-SP-ARCH standard, published by CableLabs.

SUMMARY

This patent document provides, among others, systems, devices and techniques for secure file transport mechanisms for Demarcation device under Demarcation device Auto Configuration mechanism (DAC, for short). In some disclosed embodiments, secure file transfer protocols, such as SFTP or HTTPS, requiring Demarcation device authentication at the DOCSIS back-office by providing authentication credentials, are used.

In one aspect, a method of establishing a secure file transfer session for secure downloading of service configuration files at a Demarcation device includes establishing communication with a first network device, receiving a password challenge message from the first network device, generating a username, generating a password using the password challenge message and a locally stored salt key and communicating the resulting username and the password to the first network device.

In another aspect, a method of establishing a secure file transfer session for facilitating secure downloading of service configuration files to a Demarcation device includes facilitating establishing a communication between the Demarcation device and a back-office server, receiving a control message from the back-office server specifying a password challenge transmission mode and transmitting, based on the password challenge transmission mode, a password challenge message to the Demarcation device.

This and other aspects and their implementations are described in greater detail in the drawings, the description and the claims.

BRIEF DESCRIPTION OF DRAWINGS

FIG. 3 is a flow chart representation of a process of establishing a secure file transfer session for a secure download of a service configuration file.

FIG. 4 is a block diagram representation of an apparatus for establishing a secure file transfer session for a secure download of a service configuration file.

FIG. 5 is a flow chart representation of a process of facilitating a secure download of service configuration files to a Demarcation device.

FIG. 6 is a block diagram representation of an apparatus for facilitating a secure download of service configuration files to a Demarcation device.

FIG. 7 is a flow chart representation of a process of secure delivery of service configuration files to a Demarcation device.

FIG. 8 is a block diagram representation of an apparatus for a secure delivery of service configuration files to a Demarcation device.

DETAILED DESCRIPTION

A communication system based on DPoE (DOCSIS Provisioning over EPON) can be configured to include one or more Ethernet Passive Optical Networks (EPON) and a DOCSIS Mediation Layer solution providing the translation between the EPON and the DOCSIS back-office systems for provisioning of DOCSIS services. Details of this architecture, as well as expected roles and functionalities of specific network elements (Demarcation device, B-ONU, DPoE System etc.) can be found in version 1.0 of the DPoE-SP-ARCH specification, published by CableLabs.

In the DPoE Network, Demarcation devices are of particular commercial interest, given that they support connecting business customers with multiple ports and port types on the UNI side. The Demarcation device Auto Configuration mechanism (DAC) addresses the problem of the lack of automated discovery and provisioning of the Demarcation device, using the TFTP mechanism by default.

In some implementations of the DPoE Network, Demarcation devices are configured to use only insecure file transfer mechanisms, e.g. TFTP.

The systems, devices and techniques described here provide secure file transport mechanisms for Demarcation device under DAC. In some disclosed embodiments, secure file transfer protocols, such as SFTP or HTTPS, requiring Demarcation device authentication at the DOCSIS back-office by providing authentication credentials, are used.

Figure 1:
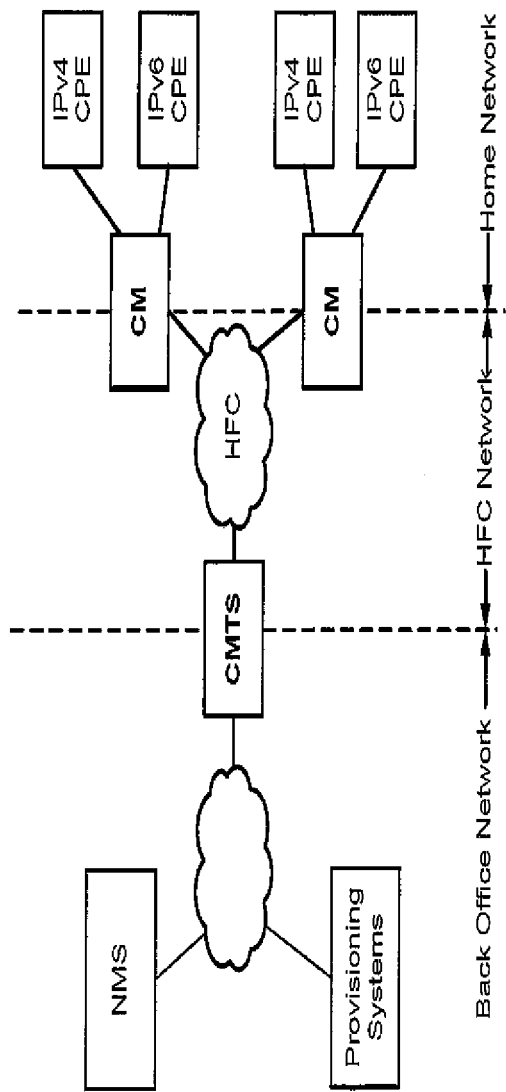
FIG. 1 is a block diagram representation of a data over cable service interface specification (DOCSIS) network.

A DOCSIS architecture is illustrated in FIG. 1 below and includes a back-office network with Network Management System (NMS) and provisioning systems, a HFC network and a home network.

A cable modem (CM) is located at a customer premise as a communication interface between the HFC network and one or more customer premise equipment (CPE) devices. The CM connects to the operator's HFC network and to a home network, bridging packets between them. CPE devices can be embedded with the CM in a single device, or an be separate standalone devices as illustrated. Examples of some CPE devices are home routers, set-top devices and personal computers. A cable modem termination system (CMTS) is located at the CATV headend. Cable systems supporting on-demand programming use a hybrid fiber-coaxial system. Fiber optic lines bring digital signals to nodes in the system where they are converted into RF channels and modem signals on coaxial trunk lines. The CMTS connects the operator's back-office and core network with the HFC network. CMTS forwards packets between these two domains, and between upstream and downstream channels on the HFC network.

Figure 2:
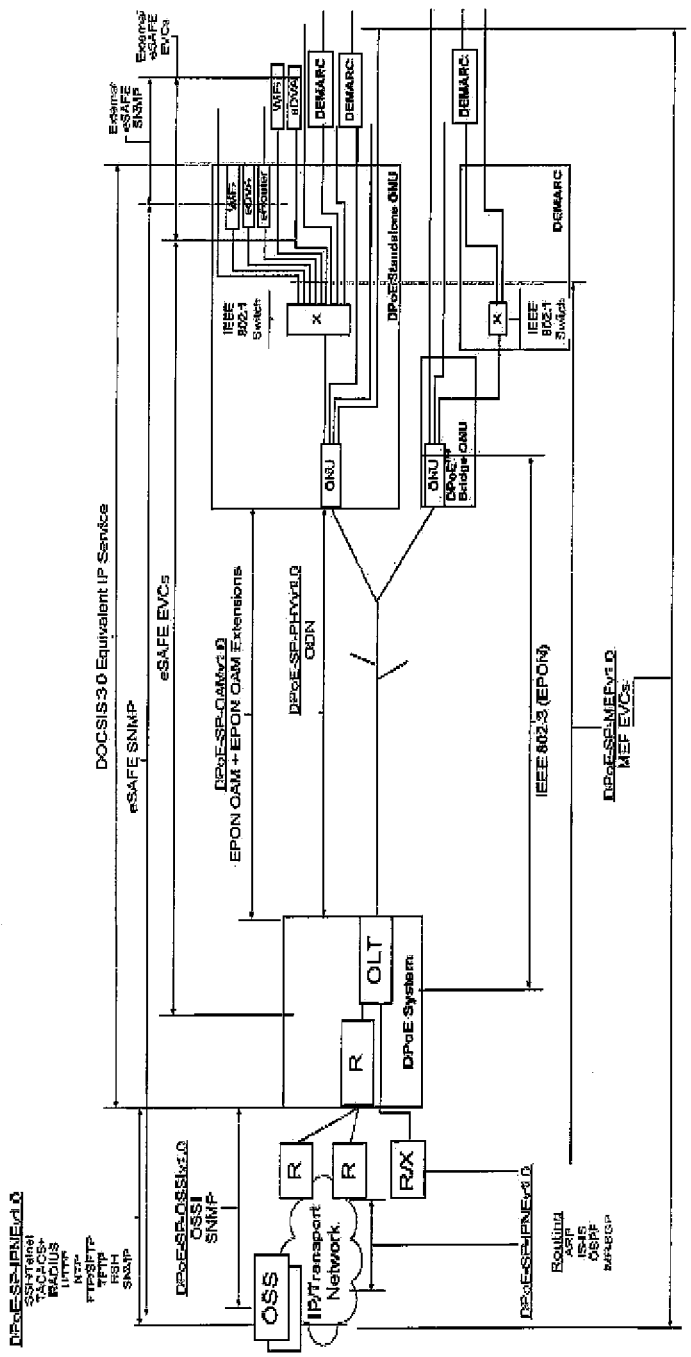
FIG. 2 is a block diagram representation of a DOCSIS passive optical Ethernet (DPoE) network, as shown in version 1.0 of the DPoE specifications published by CableLabs.

With reference to FIG. 2, DPoE (DOCSIS Provisioning over EPON) uses EPON and a dedicated middleware solution to provide the translation between the EPON and the DOCSIS back-office systems for provisioning of DOCSIS services. Details of this architecture, as well as expected roles and functionalities of specific network elements, e.g., a Demarcation device, one or more DPoE Optical Network Units (ONUs) such as a DPoE Bridge Optical Network Unit (B-ONU), the DPoE System, can be found in version 1.0 of the DPoE-SP-ARCH specification, published by CableLabs, incorporated by reference in this document.

Appendix A entitled "METHODS AND APPARATUS FOR ESTABLISHING A SECURE FILE TRANSFER SESSION FOR SECURE FILE TRANSFER TO A DEMARCATION DEVICE" is part of this document and provides additional technical information on the systems, devices and techniques for secure file transfer described here. In one aspect, this patent specification extends the existing techniques for auto-configuration of Demarcation devices in DPoE when operated with a DPoE ONU, with the ability to use the secure file transfer process on the Demarcation device. A DPoE ONU can be implemented as, e.g., a Bridge ONU (B-ONU) that is plugged into the available receptacle on a Demarcation device or a Standalone ONU (S-ONU) that is connected to a Demarcation device using a data link such as an Ethernet or other suitable data connection. Techniques for auto-configuration can be used to guarantee that the Demarcation device can be properly auto-configured to receive the configuration files from the DOCSIS back-office system and interact with the DPoE ONU unit when plugged into the receptacle. The described auto-configuration of Demarcation devices can be applied to operation of various ONUs, e.g., pluggable SFP/SFP+/XFP type B-ONUs, and B-ONUs housed in new formats of pluggable optical transceivers, provided that they are mechanically and electrically supported by the Demarcation devices. In some implementations, a single S-ONU may be connected to more than one Demarcation devices depending on one or more factors, including local conditions, the deployment scenario or the operator choice.

In the DPoE Network, DPoE ONU devices, such as B-ONU devices, are of particular commercial interest, given that they allow for single-step retrofitting of existing, deployed Demarcation devices. For B-ONU devices, Demarcation devices operating currently with copper (HFC) or Coarse wavelength division multiplexing (CWDM) optical transceivers can be retrofitted. In order to prepare a Demarcation device for operation within the DPoE Network, the pluggable transceiver module can be configured to be replaced with the B-ONU module of the appropriate mechanical and electrical format. Version 1.0 of the DPoE-SP-ARCH specifications provides the above feature and configuration of the B-ONU via the DPoE specific OAM. In case of S-ONUs, a Demarcation device can be connected to DPoE Network.

Once the Demarcation device is configured, a communication path can be established between the Demarcation device (required to be equipped with an IP address) and the back-office system, a new service configuration file can be downloaded directly into the Demarcation device using a number of mechanisms, relying on either insecure file transfer mechanisms (TFTP) or secure file transfer mechanism (SFTP, HTTPS).

This patent document describes, among other things, how to enhance the existing definition of the DAC mechanism, I01 adding specific new configuration operations and associated TLVs to support operator-selected secure file transfer mechanism, locally generate the username and password required to establish such a session and provide fallback options in case secure file transfer cannot be concluded.

During the DAC process, once the Demarcation device is assigned an IP address by the DHCP server at the DPoE System side, the Demarcation device needs to retrieve its service configuration file(s) from the DOCSIS back-office server. The number of the said service configuration files as well as their content is vendor specific and depends on the operator configuration policy. Some Demarcation devices may download a single monolithic service configuration file including configuration parameters for all services, while other devices may download a single service configuration file per service. The said service configuration file(s) are used to configure individual services on the Demarcation device, its ports and internal operation parameters I01.

The process of file transfer may use either insecure mechanisms such as TFTP or secure mechanisms such as SFTP or HTTPS, where preference is given to secure file transfer mechanism adding an additional layer of security and identity verification in the DPoE Network. In case of the secure file transfer mechanism, the Demarcation device may establish a secure connection to the back-office. In case of SFTP or HTTPS file transfer mechanism, a secure shell (SSH) connection may be established between the Demarcation device and the back-office before the file transfer can commence. In various embodiments, different versions of the SSH protocol may be used, depending on the Demarcation device capabilities. The back-office system may be designed to support any version of the SSH session, allowing full flexibility for the connecting Demarcation devices. In order to establish the said SSH connection, both the Demarcation device and the back-office may share the knowledge of a username and the associated password.

1. Username

The username for the SSH session can use one of the hardware parameters of the Demarcation device, known to the back-office system in advance (configured either manually or automatically by the operator) or learned during the Demarcation device discovery process (DAC), depending on the operator choice and provisioning strategy used in the given network.

There are various possibilities in terms of the selected Demarcation device hardware identifier; this application suggests to use the Demarcation device MAC address as a username. The Demarcation device MAC address is the MAC address used by the Demarcation device during the communication with the DHCP server, hence known to the back-office system in advance and traceable by the operator to a specific device instance. This MAC address is also referred to as Demarcation device chassis MAC address.

Other parameters may be used, such as unique device serial number, concatenation of the vendor ID and device ID, identification certificate, etc. However, these cannot be guaranteed to be globally unique and need putting forward additional requirements for Demarcation device vendors, which might be difficult to impose. There are also backward compatibility concerns for devices already deployed in-field, which might not support such unique identification string. All Demarcation device MAC address are however required to be globally unique according to the DPoE-Demarcation device-I01 and IEEE Std 802.0 specifications, hence providing a perfect username for the SSH session.

2. Password

The password for the SSH session can be any sequence of characters of the length defined by the secure file transfer protocol specification, i.e. in case of the example considered above—SFTP/HTTPS and specifically SSH session that needs to be established between the Demarcation device and the back-office system prior to the file transfer taking place.

The password may be a sequence of characters. In some embodiments, the password may be unique for the given Demarcation device. In some embodiments, the password may meet one or more of the following data security requirements: (1) not stored locally on the Demarcation device between reboots in either clear text or encrypted form, (2) be dynamically assigned by the back-office system using the challenge-response mechanism in such a way that the back-office system can pre-calculate the Demarcation device response in advance. These two requirements help prevent a majority of network-based attacks such as device identity theft, device cloning, reply attacks etc.

One way of achieving increased password security of the secure file transfer session is for the back-office system to send a password challenge towards the Demarcation device, where the Demarcation device calculates the password challenge response using a local salt and uses the resulting password in combination with the previously established username to establish the secure file transfer mechanism session with the back-office server.

3. Password Salt

In some embodiments, the Demarcation device may use its Demarcation device MAC address (as defined before) as the salt for the process of calculating the resulting password challenge response (secure file transfer session password). In general, other salt keys may be used to ensure uniqueness and security of the response.

4. Secure File Transfer Session Password Challenge

In some embodiments, the following mechanism for delivery of the secure file transfer session password challenge may be utilized.

The back-office system may configure each of (pluggable or stand-alone) D-ONUs which are known to be connected to a Demarcation device with a secure file transfer session password challenge, in the form of a sequence of arbitrary length. The back-office system may re-provision such a secure file transfer session password challenge on the D-ONU on the following events: (1) discovery and registration of a D-ONU, (2) discovery and registration (DAC) of a Demarcation device connected to the given D-ONU, (3) successful or failed configuration file transfer between the Demarcation device connected to the given D-ONU, (4) on-demand, based on operator/network manager request, and (5) any other reason not defined before. In one aspect, this guarantees that the secure file transfer session password challenge is used by the given Demarcation device only once and the whole secure file transfer infrastructure remains immune to replay attacks and device cloning.

4.1 'LLDP DPOE Secure File Transfer Session Password Challenge' TLV

The secure file transfer session password challenge may be attached to the DAC link layer discovery protocol data unit (LLDPDU) transferred by the D-ONU LLDP transmit agent towards the Demarcation device. The secure file transfer session password challenge may be packaged in a dedicated series of TLVs of the following structure. In some embodiments, the total length of the LLDPDU may be observed when attaching the 'LLDP DPoE secure file transfer session password challenge' TLV to other DPoE TLVs used for configuration of the Demarcation device port, as defined in the DPoE-Demarcation device-I01.

Name: LLDP DPoE secure file transfer session password challenge
Type.Subtype: 127.255 (0x7F.0xFF)
TLV size: see Note 1
OUI: 0x001000 (CableLabs OUI)
TLV information string (max 507 bytes)
   Part number (2 byte): see Note 2
      Actual part number (1 byte)
      Total part number (1 byte)
   Part payload (max 505 bytes): see Note 3

Note 1: the configured secure file transfer session password challenge of arbitrary length may be divided into a number of parts, each with the maximum size of 505 bytes, where a single TLV may transfer only one part of the secure file transfer session password challenge. The selection of the actual size of the TLV is implementation dependent and does not need to be regulated in any way as long as the maximum TLV size is observed. The last part of the secure file transfer session password challenge may be smaller than 505 bytes as indicated by the TLV size field.

For example, if the secure file transfer session password challenge is 1100 bytes long, three LLDP DPoE secure file transfer session password challenge TLVs will be used to transfer this file transfer session password challenge to the Demarcation device: the first TLV with 505 bytes of payload, the second TLV with 505 bytes of payload and the third TLV with 1100-505-505=90 bytes of payload. The size of individual TLVs is indicated in the 'TLV size' field by adding the size of the 'Part payload' field and the size of the 'Part number' field.

In this case, all TLVs will fit into a single LLDPDU (total size smaller than 1500 bytes). It is allowed for the TLVs to transfer in different LLDPDUs, if needed. In this case, the transmission of the secure file transfer session password challenge spans multiple LLDPDUs in a sequential manner i.e. it is restarted only when a complete secure file transfer session password challenge is transferred to the Demarcation device.

Note 2: the 'Part number' field may indicate the sequential number of the secure file transfer session password challenge part that is being transferred in the given TLV. This field comprises two subfields i.e. 'Actual part number' (1 byte) indicating the number of the current secure file transfer session password challenge part and 'Total part number' (1 byte) indicating how many parts there are in the secure file transfer session password challenge in total.

In some embodiments, the numbering may start from 0 and continue until all parts of the secure file transfer session password challenge are transferred to the Demarcation device, each in a dedicated TLV. This part number allows the Demarcation device to properly concatenate individual parts of the secure file transfer session password challenge sequence. It also allows the Demarcation device to discard any incomplete secure file transfer session password challenge sequence should the numbering carried in the 'Part number' be discontinuous in any manner i.e. one or more parts of the secure file transfer session password challenge were missing.

In some embodiments, at most 255 parts of the secure file transfer session password challenge may be transferred between the D-ONU and the Demarcation device, limiting effectively the length of the secure file transfer session password challenge to 256*505=128775 bytes. This maximum length is considered sufficient to support any existing challenge—response mechanisms with any existing state-of-the-art hashing mechanism.

Note 3: the 'Part payload' is the TLV section that carries the actual fragment of the secure file transfer session password challenge, with the maximum length of 505 bytes and the minimum length of 1 byte. The 'LLDP DPoE secure file transfer session password challenge' TLV may not be transferred by the LLDP transmit agent on the D-ONU side if the 'Part payload' size is equal to zero.

4.2. Secure File Transfer Session Password Challenge Transfer

The 'LLDP DPoE secure file transfer session password challenge' TLV as defined above may be transferred to the Demarcation devices when it is configured on the D-ONU by the back-office system. The D-ONU may not generate the secure file transfer session password challenge on its own, transfer empty 'LLDP DPoE secure file transfer session password challenge' TLVs or otherwise restart the challenge—response mechanism unless explicitly configured to do so by the back-office system. The D-ONU may continue sending the 'LLDP DPoE secure file transfer session password challenge' TLV(s) towards the Demarcation device as long as the secure file transfer session password challenge is configured on the D-ONU. Once the back-office system removes this parameter from the D-ONU, the transmission may be interrupted and the 'LLDP DPoE secure file transfer session password challenge' TLV may not be send to the Demarcation device any more.

The Demarcation device may continuously scan the incoming LLDPDUs for 'LLDP DPoE secure file transfer session password challenge' TLV(s) and once detected, retrieve the secure file transfer session password challenge, assemble it correctly (starting from part number 0 towards the part number indicates in the 'Total part number' field) and use to calculate the current password value.

The Demarcation device may not use any secure file transfer session password challenge sequences which are incomplete i.e. are missing any of the sequentially numbered parts, or known to be corrupted based on the CRC32 carried in the LLDPDU.

The Demarcation device supporting secure file transfer may not attempt the configuration file transfer until a complete secure file transfer session password challenge is received from the D-ONU and the password can be calculated, when the received LLDPDUs contain the 'LLDP DPoE secure file transfer session password challenge' TLV(s). If such TLVs are missing, such a Demarcation device supporting secure file transfer may use insecure file transfer mechanism. The Demarcation device not supporting secure file transfer ignores all received 'LLDP DPoE secure file transfer session password challenge' TLV(s) and establishes the insecure secure file transfer session at the earliest convenience.

5. Password Calculation

Once all parts of the secure file transfer session password challenge are received by the Demarcation device and the secure file transfer session password challenge is properly assembled, the Demarcation device may calculate the resulting password by taking the received secure file transfer session password challenge and the Demarcation device MAC address as two parameters.

There are multiple ways in which the resulting password can be calculated. In one example, the received secure file transfer session password challenge and the Demarcation device MAC address can be concatenated and then hashed, using any of the existing hashing mechanisms. In another example, the Demarcation device MAC address can be used as salt for the hash function applied to the received secure file transfer session password challenge. In the scope of this application, the specific mechanism to obtain the password from the Demarcation device MAC address and the received secure file transfer session password challenge is not limited. Mechanisms such as SHA family hashes (generation 0, 1, 2 or 3), MD family hashes or Whirlpool family hashes are recommended due to their low implementation and calculation cost.

The mechanism in use by the given Demarcation device type/model/make may be known in advance to the back-office, where parallel calculation takes place. The resulting hash digest represent the password to be used by the Demarcation device to establish the secure file transfer session with the back-office system. The length of the password may not be limited by this application and ought to be selected in such a way that it matches the password length required by the secure file transfer mechanism. If the available password is larger than the password length required by the secure file transfer mechanism, first N bytes of the obtained password may be used, where N is the length of the password required by the secure file transfer mechanism.

6. Selection of Secure File Transfer Mechanism and Indication of Back-Office Server Address and Service Configuration File Name The DPoE System provides a DHCP Relay Agent to relay DHCP broadcast messages from a Demarcation device to a DHCP server (upstream direction). In the downstream direction, the same DHCP Relay Agent is used to verify whether the DHCP responses sent to the Demarcation device contain the Secure File Transfer option, which provides the Demarcation device with the following information: (1) secure file transfer method, (2) URI of the back office server storing the service configuration file for the Demarcation device, and (3) service configuration file name. As an example, this DHCP option may carry the string of https://myserver.com/file=zoom.dat, pointing to a back office server located at myserver.com, on which service configuration file "zoom.dat" is stored. Additionally, the Demarcation device is requested to use HTTPS to retrieve the said file.

The DHCP server responding to DHCP requests from Demarcation devices is responsible for generating the DHCP response message containing the said Secure File Transfer option and provide necessary indication of the server URI, service configuration file name and the selected secure file transfer method. In some cases, the DHCP may be unable to insert the said DHCP option, in which case the DPoE System may be configured by the operator to insert the said DHCP option into DHCP response generated by the DHCP server in response to the DHCP request from the Demarcation device. Selection of one of these methods depends on the operator and the secure file download mechanism discussed in this application operates correctly with either of them.

Upon reception of the DHCP response containing the Secure File Transfer DHCP option, the Demarcation device processes the information contained in the said DHCP option, retrieving the URI for the back office server, target service configuration file name and the requested secure file transfer method. The back office server URI is next resolved into an IP address using the DNS service provided by the DPoE System. At this time the Demarcation device has all information to establish a secure file transfer session as described in the following section.

7. Secure Software Download Mechanism

Once the username, password, back office server address, service configuration file name and the selected file transfer method are known, the Demarcation device may establish (if supported) a secure file transfer session with the back-office server and retrieves the associated service configuration file(s). The number of the retrieved service configuration files was discussed before. Once the said service configuration file(s) are retrieved from the back-office server, the Demarcation device may proceed with the service configuration process, I01 following the rest of the DAC mechanism.

In case of Demarcation devices not supporting the selected secure file transfer mechanism, or in case of repeated (at least 3 times) failure to retrieve the service configuration file from the indicated back office server, the Demarcation device performs a fall back to an insecure file transfer mechanism, in which case TFTP is used. The back office server address and the file name remain the same. It is the responsibility of the operator to configure individual elements of the DPoE Network in such a way that the fall back mechanism to the TFTP works correctly, if needed.

7. Additional System Level Requirements

Once the Demarcation device performs a successful or failed attempt to retrieve the service configuration file(s) from the back-office system, the back-office system may re-provision the secure file transfer session password challenge on the D-ONU the given Demarcation device is connected to. The method of configuring the secure file transfer session password challenge on the D-ONU relies on the DOCSIS TLV, where the secure file transfer session password challenge is provisioned first on the vCM and then transferred to the associated D-ONU via the extended OAM, extending the model already defined in DPoE-OAM-I01.

FIG. 3 is a flow chart representation of a process 300 of establishing a secure file download session for downloading a configuration file. The process 300 may be implemented, for example, at a Demarcation device. At 302, communication is established with a first network device. The first network device may be, for example, an ONU, as discussed above. At 304, a password challenge message may be received from the first network device at the target network device i.e. Demarcation device. The password challenge message may be in the TLV format, as described previously. In some embodiments, the message may include a name field, a type field, a subtype field, an originating user identification field and an information string field, following the definitions included in IEEE Std 802.1ab-2009. At 306, a username may be generated. As previously described, the username may be generated using a unique identification string, MAC address of the device, a digital ID certificate, etc. Only one method of generating the device user name may be used in a given deployment and this method may be known in advance to the back-office system. At 308, a password may be generated using the password challenge message and a locally stored salt key, using a mechanism known in advance to the Demarcation device and the back-office system. At 310, the username and the password may be communicated to a second network device (e.g., a back-office server), via the first network device, to enable establishing a secure file connection with the second network device. When secure communication is established, service configuration files may be securely downloaded from the second network device using any secure file transfer mechanism, e.g. SFTP.

FIG. 4 is a block diagram representation of an apparatus 400 for establishing a secure file download session for the process of downloading service configuration files at a Demarcation device. The module 402 is for establishing communication with a first network device. The module 404 is for receiving a password challenge message from the first network device. The module 406 is for generating a username. The module 408 is for generating a password using the password challenge message and a locally stored salt key. The module 410 is for communicating the username and the password to the first network device to facilitate establishing a secure file transfer connection with a second network device. The apparatus 400 and the modules 402 to 410 may further be configured to implement techniques described in this patent document.

FIG. 5 is a flow chart representation of a process 500 of establishing a secure file transfer session for facilitating secure downloading of configuration files to a Demarcation device. The process 500 may be implemented, e.g., at any D-ONU type, as previously described. At 502, the establishing of a communication between the Demarcation device and a back-office server is facilitated. The facilitation may include, for example, forwarding message from the Demarcation device to the back-office server and vice versa under the guidelines of a selected secure file transfer protocol e.g. SFTP. The back-office server may be located in a DOCSIS headend. At 504, a control message is received from the back-office server. The control message may specify a password challenge transmission mode, e.g., start/stop transmissions of a password challenge message to the Demarcation device, contents of the password challenge message, and so on. The back-office system typically guarantees that the D-ONU is always configured with a fresh copy of the password challenge. Alternatively, the back-office system may elect to use the same password challenge for multiple secure file transfer sessions, in which case no reconfiguration of the password challenge on the D-ONU is needed. At 506, the password challenge message is transmitted to the Demarcation device. FIG. 6 is a block diagram representation of an apparatus 600 for establishing a secure file transfer session, facilitating secure downloading of configuration files to a Demarcation device. The module 602 is for facilitating establishing a communication between the Demarcation device and a back-office server via the D-ONU. The module 604 is for receiving a control message from the back-office server specifying a password challenge transmission mode. The module 606 is for transmitting, based on the password challenge mode, a password challenge message to the Demarcation device.

FIG. 7 is a flow chart representation of a process 700 of establishing the secure file transfer session, providing means for secure delivery of configuration files to a Demarcation device. The process 700 may be implemented, for example, at a back-office server. At 702, a network device is directed to transmit a password challenge message to the Demarcation device. The network device may be, e.g., any type of D-ONU with connected Demarcation device, as previously described. At 704, a secure transmission request message is received from the demarcation message. The message may be forwarded by the network device on behalf of the Demarcation device. The secure transmission request message may include a username and a password, which may be based, at least in part, on the password challenge message. At 706, upon successful validation of the secure transmission request message, a secure file download connection may be established with the Demarcation device, for download of configuration files for the Demarcation device. The validation may include checking authenticity of the username and the corresponding password credentials provided by the Demarcation device.

FIG. 8 is a block diagram representation of an apparatus for securely providing configuration files to a Demarcation device. The module 802 is for directing a network device to transmit a password challenge message to the Demarcation device. The module 804 is for receiving a secure transmission request message from the Demarcation device, comprising a username and a password, based, in part, on the password challenge message. The module 806 is for establishing, upon successful validation of the secure transmission request message, a secure file download connection with the Demarcation device for download of configuration files to the demarcation message via a secure connection. The apparatus 800 and the modules 802, 804, 806 may be further configured to implement other techniques disclosed in this patent document.

It will be appreciated that the present patent document discloses various techniques for securely downloading configuration files to a networked device such as a Demarcation device. The disclosed techniques may be used for establishing a secure file transfer session for secure downloading configuration files to a Demarcation device in a DPoE network. In one aspect, the disclosed techniques may be useful in enhancing security of communication by including security features such as unique username/password combination and encryption based transmission protocols.

It will further be appreciated that certain embodiments are disclosed in which the flow of establishing a secure session for configuration file downloads may be as follows: 1) DOCSIS back-office system configures D-ONU with password challenge to be used. 2) D-ONU sends continuously this password challenge on LLDP link to connected Demarcation device. 3) When a Demarcation device successfully connects (downloads the config file), D-ONU is restarted or other conditions take place (as listed on top of page 10, first para), the DOCSIS back-office system provisions a different password challenge on D-ONU, if enabled by operator. This prevents Demarcation device from using twice the same password to retrieve the config file. 4) One the password and user name are available on the Demarcation device, it connects to back-office system via SFTP (previously establishing SSH session) and downloads the config file.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination.

Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

APPENDIX A

METHODS AND APPARATUS FOR ESTABLISHING A SECURE FILE TRANSFER SESSION FOR SECURE FILE TRANSFER TO A DEMARCATION DEVICE

The present invention relates to a method of selecting the authentication parameters i.e. username and password, for the secure file transfer mechanism, e.g. SFTP, used by the Demarcation device (DEMRC) to retrieve its local configuration file from the back office server in the DPoE (DOCSIS Provisioning of EPON) architecture. This mechanism is currently not available in the DPoE architecture and the DEMARC devices may use only insecure software download mechanisms e.g. TFTP.

DPoE (DOCSIS Provisioning over EPON) describes a system comprising Ethernet Passive Optical Networks (EPON) and a DOCSIS Mediation Layer (DML) solution providing the translation between the EPON and the DOCSIS back office systems for provisioning of DOCSIS services. Details of this architecture, as well as expected roles and functionalities of specific network elements (Demarc device, B-ONU, DPoE System etc.) can be found in the DPoE-SP-ARCH standard, published by CableLabs.

In the DPoE Network, Demarcation devices are of particular commercial interest, given that they support connecting business customers with multiple ports and port types on the UNI side. The Demarcation Automated Configuration mechanism (DAC) currently under definition within CableLabs under phase 2 of the DPoE project addresses the problem of the lack of automated discovery and provisioning of the DEMARC device, using the TFTP mechanism by default.

This proposal extends the available file transport mechanisms for DEMARC under DAC into secure software download mechanisms e.g. SFTP, requiring DEMARC authentication at the DOCSIS back office by providing authentication credentials i.e. username and password. Additionally, the password should not be pre-shared to avoid password theft and device cloning.

In one aspect, the disclosed techniques overcome the existing limitations in the process of dynamic configuration of the DEMARC devices, not supporting a secure file transfer mechanism initiated by the DEMARC device, where the DEMARC device uses specific authentication credentials i.e. username and password. To eliminate such simple data security threats as device cloning, password retrieval and replay attacks, the password should not be stored on the DEMARC device and should be generated dynamically on the DEMARC registration event i.e. when the DEMARC goes through the DAC mechanism. The proposed mechanism extends the DAC mechanism, adding a 'LLDP DPoE secure file transfer session password challenge' TLV, requirements for username and password, as well as new process requirements to the LLDP exchange between the D-ONU and the DEMARC device, new system level requirements for secure file transfer session password challenge configuration on the D-ONU, D-ONU and DEMARC device operation.

This description builds on the existing definition of the DAC mechanism, as specified in DPoE-DEMARC-D01 specification, extending the process described therein by adding specific new configuration steps and associated TLVs.

During the DAC process, once the DEMARC is assigned an IP address by the DHCP server at the DPoE System side, the DEMARC needs to retrieve its local configuration file(s) from the DOCSIS back office server. The number of the said configuration files as well as their content is vendor specific and depends on the operator configuration policy. Some DEMARC devices may download a single monolithic configuration file including configuration parameters for all services, while other devices may download a single configuration file per service. The said configuration file(s) are used to configure individual services on the DEMARC, its ports and internal operation parameters, as defined in the DPoE-DEMARC-D01 specification.

The process of file transfer may use either insecure mechanisms such as TFTP or secure mechanisms such as SFTP. In case of the secure file transfer mechanism, the DEMARC must establish a secure connection to the back office. In the case of SFTP file transfer mechanism, an SSH connection must be established between the DEMARC and the back office before the file transfer can commence. In the scope of this application, any version of the SSH protocol may be used, depending on the DEMARC device capabilities. The back office system typically can support any version of the SSH session allowing full flexibility for the connecting DEMARC devices. In order to establish the said SSH connection, both the DEMARC and the back office must share the knowledge of a username and the associated password.

1. USERNAME

The username for the SSH session can use one of the hardware parameters of the DEMARC device, known to the back office system in advance (configured either manually or automatically by the operator) or learned during the DEMARC device discovery process (DAC), depending on the operator choice and provisioning strategy used in the given network.

There are various possibilities in terms of the selected DEMARC device hardware identifier; this application suggests to use the DEMARC MAC address as a username. The DEMARC MAC address is the MAC address used by the DEMARC during the communication with the DHCP server, hence known to the back office system in advance and traceable by the operator to a specific device instance.

Other parameters may be used, such as unique device serial number, concatenation of the vendor ID and device ID, identification certificate, etc., however, these cannot be guaranteed to be unique and require additional requirements for DEMARC vendors. There are also backward compatibility concerns for devices already deployed in-field, which might not support such unique identification string. All DEMARC MAC address are however required to be globally unique according to the DPoE-DEMARC-D01 specification, hence providing a perfect username for the SSH session.

2. PASSWORD

The password for the SSH session can be any sequence of characters of the length defined by the secure file transfer protocol specification, i.e. in case of the example considered above –

SFTP and specifically SSH session that needs to be established between the DEMARC device and the back office system prior to the file transfer taking place.

The password is a sequence of characters should be unique for the given DEMARC device and at best meet the following data security requirements: (1) not stored locally on the DEMARC device in either clear text or encrypted form between reboots, (2) be dynamically assigned by the back office system using the challenge-response mechanism in such a way that the back office system can pre-calculate the DEMARC response in advance. These two requirements prevent the majority of network-based attacks such as device identity theft, device cloning, reply attacks etc.

One way of achieving increased password security of the secure file transfer session is for the back office system to send a password challenge towards the DEMARC, where the DEMARC calculates the password challenge response using a local salt and uses the resulting password in combination with the previously established username to establish the secure file transfer mechanism session with the back office system.

3. PASSWORD SALT

In the scope of this application, it is proposed for the DEMARC device to use its DEMARC MAC address (as defined before) as the salt for the process of calculating the resulting password challenge response (secure file transfer session password).

4. SECURE FILE TRANSFER SESSION PASSWORD CHALLENGE

In the scope of this application, the following mechanism for delivery of the secure file transfer session password challenge is proposed.

The back office system configures each of (pluggable or stand-alone) D-ONUs which are known to be connected to a DEMARC device with a secure file transfer session password challenge, in the form of a sequence of arbitrary length. The back office system must re-provision such a secure file transfer session password challenge on the D-ONU on the following events: (1) discovery and registration of a D-ONU, (2) discovery and registration (DAC) of a DEMARC device connected to the given D-ONU, (3) successful or failed configuration file transfer between the DEMARC device connected to the given D-ONU. This guarantees that the secure file transfer session password challenge is used by the given DEMARC device only once and the whole secure software download infrastructure remains immune to replay attacks and device cloning.

4.1 'LLDP DPOE SECURE FILE TRANSFER SESSION PASSWORD CHALLENGE' TLV

The said secure file transfer session password challenge must be attached to the DAC LLDPDU transferred by the D-ONU LLDP transmit agent towards the DEMARC device. The secure file transfer session password challenge is packaged in a dedicated series of TLVs of the following structure. Note that the total length of the LLDPDU must be observed when attaching the 'LLDP DPoE secure file transfer session password challenge' TLV to other DPoE TLVs used for configuration of the DEMARC device port, as defined in the DPoE-DEMARC-D01.

Name: LLDP DPoE secure file transfer session password challenge
Type.Subtype: 127.255 (0x7F.0xFF)
TLV size: see Note 1
OUI: 0x001000 (CableLabs OUI)
TLV information string (max 511 bytes)
    Part number (2 byte): see Note 2
        Actual part number (1 byte)
        Total part number (1 byte)
    Part payload (max 509 bytes): see Note 3

Note 1: the configured secure file transfer session password challenge of arbitrary length is divided into a number of parts, each of at most 509 bytes of length, where a single TLV may transfer only one part of the secure file transfer session password challenge. The last part of the secure file transfer session password challenge may be smaller than 509 bytes as indicated by the TLV size field.
For example, if the secure file transfer session password challenge is 1100 bytes long, three LLDP DPoE secure file transfer session password challenge TLVs will be used to transfer this file transfer session password challenge to the DEMARC device: the first TLV with 509 bytes of payload, the second TLV with 509 bytes of payload and the third TLV with 1100 − 509 − 509 = 82 bytes of payload. The size of individual TLVs is indicated in the 'TLV size' field by adding the size of the 'Part payload' field and the size of the 'Part number' field.
In this case, all TLVs will fit into a single LLDPDU (total size smaller than 1500 bytes). It is allowed for the TLVs to transfer in different LLDPDUs, if needed. In this case, the transmission of the secure file transfer session password challenge spans multiple LLDPDUs in s sequential manner i.e. it is restarted only when a complete secure file transfer session password challenge is transferred to the DEMARC device.

Note 2: the 'Part number' field indicates the sequential number of the secure file transfer session password challenge part that is being transferred in the given TLV. This field comprises two subfields i.e. 'Actual part number' (1 byte) indicating the number of the current secure file transfer session password challenge part and 'Total part number' (1 byte) indicating how many parts there are in the secure file transfer session password challenge in total.
The numbering starts from 0 and continues until all parts of the secure file transfer session password challenge are transferred to the DEMARC device, each in a dedicated TLV. This part number allows the DEMARC device to properly concatenate individual parts of the secure file transfer session password challenge sequence. It also allows the DEMARC device to discard any incomplete secure file transfer session password challenge sequence should the numbering carried in the 'Part number' be discontinuous in any manner i.e. one or more parts of the secure file transfer session password challenge were missing.
At most 255 parts of the secure file transfer session password challenge can be transferred between the D-ONU and the DEMARC device, limiting effectively the length of the secure file transfer session password challenge to 256 * 509 = 130304 bytes. This maximum length is considered sufficient to support any existing challenge – response mechanisms with any existing state-of-the-art hashing mechanism.

Note 3: the 'Part payload' is the TLV section that carries the actual fragment of the secure file transfer session password challenge, with the maximum length of 509 bytes and the minimum length of 1 byte. The 'LLDP DPoE secure file transfer session password challenge'

TLV must not be transferred by the LLDP transmit agent on the D-ONU side if the 'Part payload' size is equal to zero.

4.2. SECURE FILE TRANSFER SESSION PASSWORD CHALLENGE TRANSFER

The 'LLDP DPoE secure file transfer session password challenge' TLV as defined above must be transferred to the DEMARC devices when it is configured on the D-ONU by the back-office system. The D-ONU must not generate the secure file transfer session password challenge on its own, transfer empty 'LLDP DPoE secure file transfer session password challenge' TLVs or otherwise restart the challenge – response mechanism unless explicitly configured to do so by the back office system. The D-ONU must continue sending the 'LLDP DPoE secure file transfer session password challenge' TLV(s) towards the DEMARC device as long as the secure file transfer session password challenge is configured on the D-ONU. Once the back office system removes this parameter from the D-ONU, the transmission must be interrupted and the 'LLDP DPoE secure file transfer session password challenge' TLV must not be send to the DEMARC device any more.

The DEMARC device must continuously scan the incoming LLDPDUs for 'LLDP DPoE secure file transfer session password challenge' TLV(s) and once detected, retrieve the secure file transfer session password challenge, assemble it correctly (starting from part number 0 towards the part number indicates in the 'Total part number' field) and use to calculate the current password value.

The DEMARC device must not use any secure file transfer session password challenge sequences which are incomplete i.e. are missing any of the sequentially numbered parts, or known to be corrupted based on the CRC32 carried in the LLDPDU.

The DEMARC device supporting secure software download must not attempt the configuration software download until a complete secure file transfer session password challenge is received from the D-ONU and the password can be calculated, when the received LLDPDUs contain the 'LLDP DPoE secure file transfer session password challenge' TLV(s). If such TLVs are missing, such a DEMARC device supporting secure software download will use insecure software download mechanism. The DEMARC device not supporting secure software download ignores all received 'LLDP DPoE secure file transfer session password challenge' TLV(s) and establishes the insecure secure software download session at the earliest convenience.

5. PASSWORD CALCULATION

Once all parts of the secure file transfer session password challenge are received by the DEMARC device and the secure file transfer session password challenge is properly assembled, the DEMARC device calculates the resulting password by taking the received secure file transfer session password challenge and the DEMARC MAC address as two parameters.

There are multiple ways in which the resulting password can be calculated. In one example, the received secure file transfer session password challenge and the DEMARC MAC address can be concatenated and then hashed, using any of the existing hashing mechanisms. In another example, the DEMARC MAC address can be used as salt for the hash function applied to the received secure file transfer session password challenge. In the scope of this application, the specific mechanism to obtain the password from the DEMARC MAC address and the received secure file transfer session password challenge is not limited. Mechanisms such as SHA family hashes (generation 0, 1, 2 or 3), MD family hashes or Whirlpool family hashes are recommended due to their low implementation and calculation cost.

The mechanism in use by the given DEMARC device type / model / make must be known in advance to the back office, where parallel calculation takes place. The resulting hash digest represent the password to be used by the DEMARC device to establish the secure file transfer session with the back office system. The length of the password is not limited by this application and ought to be selected in such a way that it matches the password length required by the secure software download mechanism. If the available password is larger than the password length required by the secure software download mechanism, first N bytes of the obtained password may be used, where N is the length of the password required by the secure software download mechanism.

6. SECURE SOFTWARE DOWNLOAD MECHANISM

Once the username and the password are known, the DEMARC device establishes (if supported) a secure software download session with the back office server and retrieves the associated configuration file(s). The number of the retrieved configuration files was discussed before. Once the configuration file(s) are retrieved from the back office server, the DEMARC device proceeds with the configuration process, as defined in the DPoE-DEMARC-D01.

7. ADDITIONAL SYSTEM LEVEL REQUIREMENTS

Once the DEMARC device performs a successful or failed attempt to retrieve the configuration file(s) from the back office system, the said back office system must re-provision the secure file transfer session password challenge on the D-ONU the given DEMARC device is connected to. The method of configuring the secure file transfer session password challenge on the D-ONU relies on the TLV, where the secure file transfer session password challenge is provisioned first on the vCM and then transferred to the associated D-ONU via the LOAM, as defined in DPoE-OAM-D01.

What is claimed is what is disclosed and illustrated, including:

1. A method of establishing a secure file transfer session for secure downloading of configuration files at a Demarcation device, comprising:
   establishing communication with a first network device, the first network device coupled to the Demarcation device and a second network device for establishing a connection between the Demarcation device and the second network device;
   receiving a password challenge message including a dynamically-assigned password challenge parameter from the first network device, wherein the password challenge message is configured into a form of a sequence of information elements, each of the information elements including a type field, a length field, and a value field that includes a part number for identifying each of the information element in the sequence to allow a transmission of the dynamically-assigned password challenge parameter having an arbitrary length;
   generating, using a device-specific identification, a username that is globally unique; wherein the device-specific identification includes a media access control (MAC) identification (ID), a MAC address, a device serial number, a vendor ID or an identification certificate;
   generating a password using the password challenge message and a locally stored salt key, wherein the generating of the password includes:
      discarding the password challenge message upon determining that the part numbers identifying the information elements are incomplete, and
      assembling, upon determining that the part numbers are complete, the sequence of information elements based on values of the part numbers to obtain the password using a hash mechanism; and
   communicating the globally unique username and the password to the second network device to facilitate establishing the secure file transfer connection with the second network device;
   wherein the first network device comprises a data over cable service interface specification (DOCSIS) optical network unit (D-ONU) and the second network device comprises a DOCSIS back-office server.

2. The method as in claim 1, wherein each of the information elements further includes a name field, a subtype field, and an originating user identification field, a format of each of the information elements following requirements of IEEE Std 802.1AB-2009.

3. An apparatus for establishing a secure file transfer session for secure downloading of configuration files at a Demarcation device, comprising:
   a memory; and
   a processor configured to read code instructions from the memory and perform operations of:
      establishing communication with a first network device, the first network device coupled to the Demarcation device and a second network device for establishing a connection between the Demarcation device and the second network device;
      receiving a password challenge message including a dynamically-assigned password challenge parameter from the first network device, wherein the password challenge message is configured into a form of a sequence of information elements, each of the information elements including a type field, a length field, and a value field that includes a number to identify each of the information element in the sequence to allow the dynamically-assigned password challenge parameter to have an arbitrary length;
      generating, using a device-specific identification, a username that is globally unique;
      wherein the device-specific identification includes a media access control (MAC) identification (ID), a MAC address, a device serial number, a vendor ID or an identification certificate;
      generating a password using the password challenge message and a locally stored salt key, wherein the generating of the password includes:
         discarding the password challenge message upon determining that the part numbers identifying the information elements are incomplete, and
         assembling, upon determining that the part numbers are complete, the sequence of information elements based on values of the part numbers to obtain the password using a hash mechanism; and
      communicating the username and the password to the second network device to facilitate establishing a secure file transfer connection with the second network device;
      wherein the first network device comprises a data over cable service interface specification (DOCSIS) optical network unit (D-ONU) and the second network device comprises a DOCSIS back-office server.

4. A computer program product comprising a non-transitory computer-readable medium having instructions stored thereon, the instructions comprising code for:
   establishing communication with a first network device, the first network device coupled to the Demarcation device and a second network device for establishing a connection between the Demarcation device and the second network device;
   receiving a password challenge message including a dynamically-assigned password challenge parameter from the first network device, wherein the password challenge message is configured into a form of a sequence of information elements, each of the information elements including a type field, a length field, and a value field that includes a number to identify each of the information element in the sequence to allow the dynamically-assigned password challenge parameter to have an arbitrary length,
   generating, using a device-specific identification, a username that is globally unique;
   wherein the device-specific identification includes a media access control (MAC) identification (ID), a MAC address, a device serial number, a vendor ID or an identification certificate;
   generating a password using the password challenge message and a locally stored salt key, wherein the generating of the password includes:
      discarding the password challenge message upon determining that the part numbers identifying the information elements are incomplete, and
      assembling, upon determining that the part numbers are complete, the sequence of information elements based on values of the part numbers to obtain the password using a hash mechanism; and
   communicating the username and the password to the second network device to facilitate establishing a secure file transfer connection with the second network device;

wherein the first network device comprises a data over cable service interface specification (DOCSIS) optical network unit (D-ONU) and the second network device comprises a DOCSIS back-office server.

5. The apparatus as in claim 3, wherein each of the information elements further includes a name field, a subtype field, and an originating user identification field, a format of each of the information elements following requirements of IEEE Std 802.1AB-2009.

6. The computer program product of claim 4, wherein each of the information elements further includes a name field, a subtype field, and an originating user identification field, a format of each of the information elements following requirements of IEEE Std 802.1AB-2009.

7. The method of claim 1, wherein the locally stored salt key includes a MAC address of the Demarcation device.

8. The method of claim 1, wherein the secure file transfer session uses a secure file transfer protocol (SFTP).

9. The method of claim 1, wherein the secure file transfer session uses a secure hypertext transfer protocol (HTTPS).

10. The apparatus as in claim 3, wherein the locally stored salt key includes a MAC address of the Demarcation device.

11. The apparatus of claim 3, wherein the secure file transfer session uses a secure file transfer protocol (SFTP).

12. The apparatus of claim 3, wherein the secure file transfer session uses a secure hypertext transfer protocol (HTTPS).

13. The computer program product of claim 4, wherein the locally stored salt key includes a MAC address of the Demarcation device.

14. The computer program product of claim 4, wherein the secure file transfer session uses a secure file transfer protocol (SFTP).

15. The computer program product of claim 4, wherein the secure file transfer session uses a secure hypertext transfer protocol (HTTPS).

* * * * *

UNITED STATES PATENT AND TRADEMARK OFFICE
CERTIFICATE OF CORRECTION

PATENT NO. : 10,178,085 B2
APPLICATION NO. : 14/129884
DATED : January 8, 2019
INVENTOR(S) : Marek Hajduczenia Page 1 of 1

It is certified that error appears in the above-identified patent and that said Letters Patent is hereby corrected as shown below:

On the Title Page

In Item (73), under "Assignee", in Column 1, Lines 1-2, delete "ZTE Portugal-Projectos de Telecommunicações Unipessoal Lda," and insert -- ZTE Portugal-Projectos de Telecomunicações Unipessoal Lda, --, therefor.

In the Specification

In Column 10, Lines 45-55, delete "FIG. 6 is a...................................device." and insert the same at Line 46, as a new paragraph.

In the Claims

In Column 30, Line 2, in Claim 9, delete "secure hypertext transfer protocol" and insert -- hypertext transfer protocol secure --, therefor.

In Column 30, Line 8, in Claim 12, delete "secure hypertext transfer protocol" and insert -- hypertext transfer protocol secure --, therefor.

In Column 30, Lines 16-17, in Claim 15, delete "secure hypertext transfer protocol" and insert -- hypertext transfer protocol secure --, therefor.

Signed and Sealed this
Third Day of November, 2020

Andrei Iancu
*Director of the United States Patent and Trademark Office*